United States Patent
Natarajan et al.

(10) Patent No.: US 6,434,120 B1
(45) Date of Patent: *Aug. 13, 2002

(54) AUTOSENSING LMI PROTOCOLS IN FRAME RELAY NETWORKS

(75) Inventors: Shankar Natarajan, Fremont; Gregory A. Fowler, Mountain View, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/140,178

(22) Filed: Aug. 25, 1998

(51) Int. Cl.[7] ............................................... H04L 12/00
(52) U.S. Cl. ....................................... 370/255; 370/465
(58) Field of Search ................................. 370/254, 256, 370/257, 258, 351, 389, 400, 401, 402, 465, 494, 466, 467, 410; 709/220, 221, 222

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |

(List continued on next page.)

FOREIGN PATENT DOCUMENTS

| | | |
|---|---|---|
| EP | 0 384 758 A2 | 8/1990 |
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

William Stallings, data and Computer Communications, pp: 329–333, Prentice Hall, Upper Saddle River, New Jersey 07458.

(List continued on next page.)

*Primary Examiner*—Kwang Bin Yao
(74) *Attorney, Agent, or Firm*—Beyer Weaver & Thomas, LLP; David E. Wolf, Esq.

(57) ABSTRACT

The invention provides a method and system for autosensing LMI protocols in frame relay networks. When a router is first coupled to a frame relay network, it automatically configures the local management interface (LMI) to use one of a selected set of possible LMI protocols, by generating a set of protocol requests for a plurality of protocols, and by thereafter simultaneously listening for protocol responses from the configuration server. Multiple valid responses from the configuration server are assigned priority in response to which valid response is last to arrive.

14 Claims, 1 Drawing Sheet

U.S. PATENT DOCUMENTS

| | | |
|---|---|---|
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,767 A | 10/1990 | Kinoshita et al. |
| 4,965,772 A | 10/1990 | Daniel et al. |
| 4,970,678 A | 11/1990 | Sladowski et al. |
| 4,979,118 A | 12/1990 | Kheradpir ................... 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,034,919 A | 7/1991 | Sasai et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,804 A | 2/1996 | Heath et al. |
| 5,509,006 A | 4/1996 | Wilford et al. |
| 5,519,704 A | 5/1996 | Farinacci et al. |
| 5,519,858 A | 5/1996 | Walton et al. ............... 395/600 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Chenrukuri et al. |
| 5,602,770 A | 2/1997 | Ohira |
| 5,604,868 A | 2/1997 | Komine et al. |
| 5,617,417 A | 4/1997 | Sathe et al. |
| 5,617,421 A | 4/1997 | Chin et al. |
| 5,630,125 A | 5/1997 | Zellweger |

| | | | |
|---|---|---|---|
| 5,631,908 A | 5/1997 | Saxe | |
| 5,632,021 A | 5/1997 | Jennings et al. | |
| 5,634,010 A | 5/1997 | Ciscon et al. | |
| 5,638,359 A | 6/1997 | Peltola et al. | |
| 5,644,718 A | 7/1997 | Belove et al. | |
| 5,659,684 A | 8/1997 | Giovannoni et al. | |
| 5,666,353 A | 9/1997 | Klausmeier et al. | |
| 5,673,265 A | 9/1997 | Gupta et al. | |
| 5,678,006 A | 10/1997 | Valizadeh et al. | |
| 5,680,116 A | 10/1997 | Hashimoto et al. | |
| 5,684,797 A | 11/1997 | Aznar et al. | |
| 5,687,324 A | 11/1997 | Green et al. | |
| 5,689,506 A | 11/1997 | Chiussi et al. | |
| 5,694,390 A | 12/1997 | Yamato et al. | |
| 5,724,351 A | 3/1998 | Chao et al. | |
| 5,740,097 A | 4/1998 | Satoh | |
| 5,748,186 A | 5/1998 | Raman | |
| 5,748,617 A | 5/1998 | McLain, Jr. | |
| 5,754,547 A | 5/1998 | Nakazawa | |
| 5,802,042 A | * 9/1998 | Natarajan et al. | 370/255 |
| 5,802,054 A | 9/1998 | Bellenger | |
| 5,809,076 A | * 9/1998 | Hofmann | 375/257 |
| 5,835,710 A | 11/1998 | Nagami et al. | |
| 5,841,874 A | 11/1998 | Kempke et al. | |
| 5,854,903 A | 12/1998 | Morrison et al. | |
| 5,856,981 A | 1/1999 | Voelker | |
| 5,892,924 A | 4/1999 | Lyon et al. | 395/200.75 |
| 5,898,686 A | 4/1999 | Virgile | |
| 5,903,559 A | 5/1999 | Acharya et al. | |
| 5,940,376 A | * 8/1999 | Yanacek et al. | 370/250 |
| 6,097,718 A | * 8/2000 | Bion | 370/351 |

OTHER PUBLICATIONS

Allen, M., "Novell IPX Over Various WAN Media (IPXWAN)," Network Working Group, RFC 1551, Dec. 1993, pp. 1–22.

Becker, D., "3c589.c: A 3c589 EtherLink3 ethernet driver for linux," becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

* cited by examiner

AUTOSENSING LMI PROTOCOLS IN FRAME RELAY NETWORKS

BACKGROUND OF THE INVENTION

1. Field of the Invention

This invention relates to autosensing LMI protocols in frame relay networks.

2. Description of Related Art

Frame relay networks include a number of remote stations, each coupled to another; one node may be designated as a server node. When the number of remote stations is large, or if the remote station is geographically remote, it can be difficult to assure that remote stations are properly configured for use with the network, due in part to lack of technical resources. One aspect of properly configuring the remote station is to assure that it uses the correct one of multiple possible protocols for the local management interface (LMI) for the connection between the remote station and an edge of the frame relay network at a frame relay switch; these possible protocols are called LMI protocols.

In one system for automated configuration of a remote station, the remote station attempts to communicate with frame relay network equipment using a series of LMI protocols, each tested in sequence. While this technique achieves the goal of sensing LMI protocols, it has the drawbacks of taking more time than necessary, and of predetermining an order for selection of an LMI protocol which may not ultimately be preferred.

Accordingly, it would be advantageous to provide an improved technique for autosensing LMI protocols in frame relay networks.

SUMMARY OF THE INVENTION

The invention provides a method and system for autosensing LMI protocols in frame relay networks. When a router (or other client process) is first coupled to a frame relay network, it automatically configures the local management interface (LMI) to use one of a selected set of possible LMI protocols, by generating a set of protocol requests for a plurality of protocols, and by thereafter simultaneously listening for protocol responses from the frame relay network equipment or switch. In a preferred embodiment, multiple valid responses from the frame relay network equipment are assigned priority in response to which valid response is last to arrive.

DESCRIPTION OF THE PREFERRED EMBODIMENT

Figure 1:
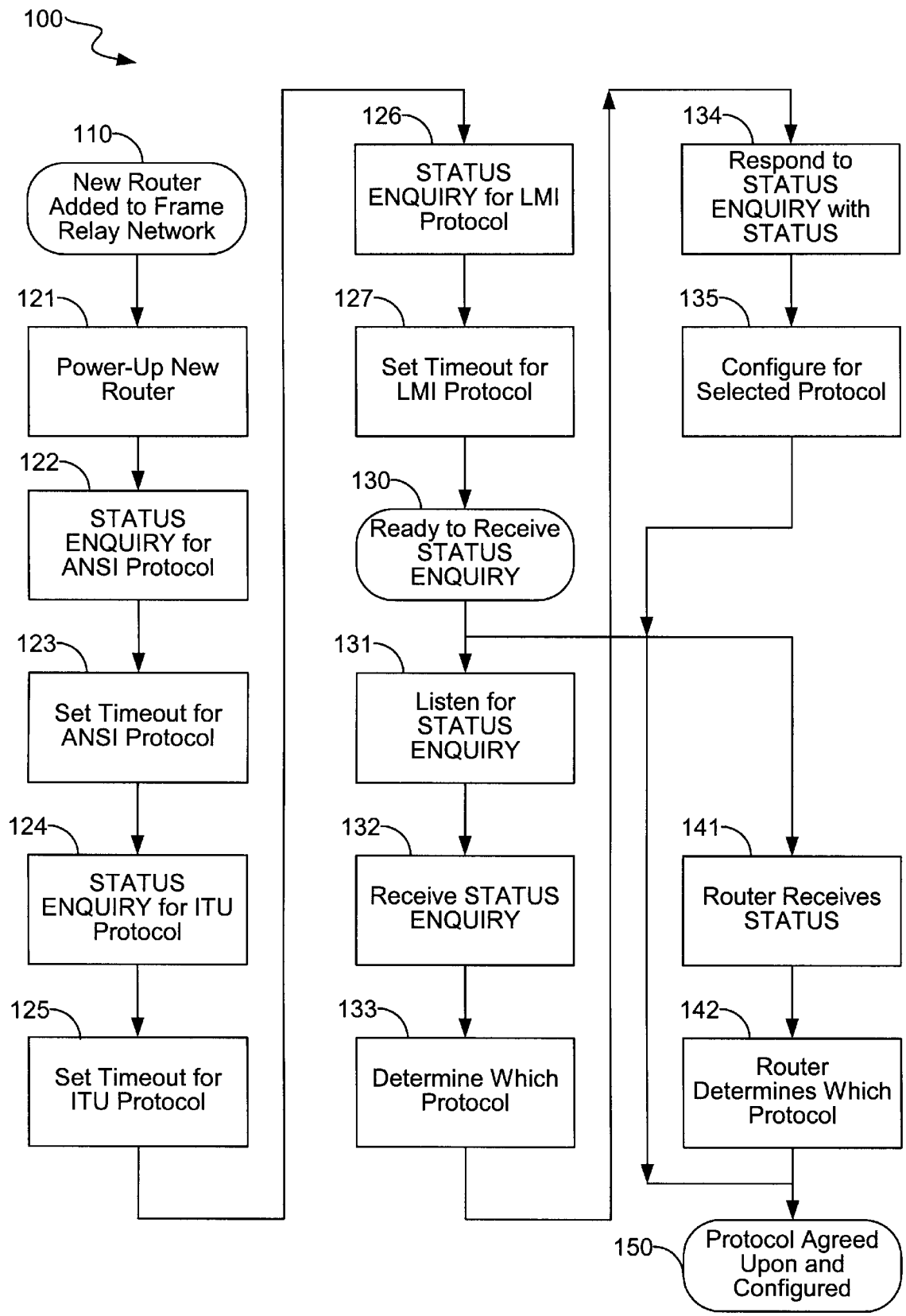
FIG. 1 shows a method of autosensing LMI protocols in frame relay networks.

In the following description, a preferred embodiment of the invention is described with regard to preferred process steps and data structures. However, those skilled in the art would recognize, after perusal of this application, that embodiments of the invention may be implemented using a computer at each site operating under program control, and that modification of a set of general purpose computers to implement the process steps and data structures described herein would not require undue invention.

AUTOSENSING LMI PROTOCOLS IN FRAME RELAY NETWORKS

FIG. 1 shows a method of autosensing LMI protocols in frame relay networks.

A method 100 of autosensing LMI protocols is performed in a frame relay network.

At a flow point 110, a new router has been added to a frame relay network.

In a preferred embodiment this method is performed for a new router being added to a frame relay network and downloading configuration information from a configuration server on the frame relay network. However, in alternative embodiments, the method may be performed for any client process which is establishing or re-establishing contact with a server process.

At a step 121, the router is powered up and attempts to contact the frame relay network equipment or switch.

At a step 122, the router transmits a "STATUS ENQUIRY" message using a first LMI (local management interface) protocol.

In a preferred embodiment, this first LMI protocol is the "ANSI" protocol, as described in "Integrated Services Digital Network (ISDN)—Signaling Specification for Frame Relay Bearer Service for Digital Subscriber Signaling System Number 1 (DSS1)", ANSI Document T1.617-1991, Annex D, hereby incorporated by reference as if fully set forth herein.

At a step 123, after transmitting the message, the router sets a timeout for a response to that message, and starts a timer interrupt to occur on that timeout. This timeout is preferably set for T391 seconds; the T391 timeout is described on page 75, table D.2, of ANSI Document T1.617-1991, and is preferably between about 5 to about 30 seconds, such as about 10 seconds. The router listens on LMI management channel number zero (0) for a response.

At a step 124, the router transmits a "STATUS ENQUIRY" message using a second LMI (local management interface) protocol. In a preferred embodiment, this second LMI protocol is the "ITU" protocol, as described in "International Telegraph and Telephone Consultative Committee—Digital Subscriber Signaling System No. 1 (DSS1). Signaling Specification for Frame Mode Basic Call Control, CCITT Document Q.933, 1992, hereby incorporated by reference as if fully set forth herein.

At a step 125, after transmitting the message, the router sets a timeout for a response to that message, and starts a timer interrupt to occur on that timeout. This timeout is preferably set for T391 seconds. The router listens on LMI management channel number zero (0) for a response.

At a step 126, the router transmits a "STATUS ENQUIRY" message using a third LMI (local management interface) protocol. In a preferred embodiment, this third LMI protocol is the LMI protocol described in "Frame Relay Specification with Extensions—Based on Proposed T1S1 Standards", Document Number 001-208966, Revision 1.0 (Sep. 18, 1990), sometimes called the "gang of four" protocol and herein called the "LMI" protocol, hereby incorporated by reference as if fully set forth herein.

At a step 127, after transmitting the message, the router sets a timeout for a response to that message, and starts a timer interrupt to occur on that timeout. This timeout is preferably set for nT1 seconds; the nT1 timeout is described on page 6–12 of Document Number 001-208966, and is preferably between about 5 to about 30 seconds, such as about 10 seconds. The router listens on LMI management channel number 1023 for a response.

Although in a preferred embodiment the router transmits the "STATUS ENQUIRY" message using LMI protocols in the order described for the steps 122, 124, and 126, in alternative embodiments it would be possible to use a different order in which the messages are sent, a different number of LMI protocols to test, or a different set of LMI protocols for test.

Although in a preferred embodiment the timeouts are set for the values described for the steps 123, 125, and 127, in alternative embodiments it would be possible to use a different set of values for the timeouts. Moreover, although in a preferred embodiment the timeouts are set using multiple timer interrupts, in alternative embodiments it would be possible to use other techniques for setting and catching timeouts, such as a single timeout for all three messages, or a non-interrupt-based technique.

At a flow point 130, the frame relay network equipment is ready to receive a "STATUS ENQUIRY" message, and the router is listening for responses to one or more of the "STATUS ENQUIRY" messages.

At a step 131, the frame relay network equipment listens for a "STATUS ENQUIRY" message. The frame relay network equipment sets a timeout for receiving that message, and starts a timer interrupt to occur on that timeout. This timeout is preferably set for nT2 or T392 seconds (from the frame relay network equipment's perspective), such as about 15 seconds, as described in ANSI Document T1.617-1991 and in Document Number 001-208966. When the timeout occurs, the method continues at the flow point 140.

At a step 132, the frame relay network equipment receives one of the "STATUS ENQUIRY" messages.

At a step 133, the frame relay network equipment determines if the received "STATUS ENQUIRY" message is for an LMI protocol it recognizes. If not, the frame relay network equipment continues to listen for a "STATUS ENQUIRY" message at the step 131. In a preferred embodiment, the frame relay network equipment logs an error event if the received "STATUS ENQUIRY" message is for an LMI protocol which it does not recognize.

At a step 134, the frame relay network equipment responds to the "STATUS ENQUIRY" message by transmitting a "STATUS" message on the appropriate LMI management channel. If the "STATUS ENQUIRY" message was for the ANSI protocol, the frame relay network equipment transmits the "STATUS" message on LMI management channel zero; if the "STATUS ENQUIRY" message was for the ITU protocol, the frame relay network equipment transmits the "STATUS" message on LMI management channel zero; if the "STATUS ENQUIRY" message was for the LMI protocol, the frame relay network equipment transmits the "STATUS" message on LMI management channel 1023.

At a step 135, the frame relay network equipment should further respond to the "STATUS ENQUIRY" message by configuring itself to use the LMI protocol associated with that message. In a preferred embodiment, the frame relay network equipment will so configure itself, but in the event it does not, the process begins again in an attempt to deliver the "STATUS ENQUIRY" message and cause the frame relay network equipment to so configure itself.

The frame relay network equipment then continues with the step 131 to receive any further "STATUS ENQUIRY" messages.

The steps 131 through 135 are performed in parallel with the steps 141 through 142.

At a step 141, the router receives a "STATUS" message for one of the LMI protocols.

At a step 142, the router determines which LMI protocol the "STATUS" message is for, and configures itself for that LMI protocol.

The router then continues with the step 141 to receive any further "STATUS" messages. The router catches any timeout interrupts for the "STATUS ENQUIRY" messages transmitted in the steps 122, 124, and 126, until all "STATUS ENQUIRY" messages have been responded to or have timed out. Thereafter, the method proceeds at the flow point 150.

At a flow point 150, the frame relay network equipment has received at least one "STATUS ENQUIRY" message from the router, and the router has received at least one "STATUS" message in response thereto.

If the frame relay network equipment has only recognized one LMI protocol, it has responded to the "STATUS ENQUIRY" message for that LMI protocol only, and the router has therefore received only one "STATUS" message. The router and frame relay network equipment have therefore configured themselves for that one LMI protocol only.

If the frame relay network equipment has recognized more than one LMI protocol, it has responded to the "STATUS ENQUIRY" message for each of those LMI protocols, and has configured itself for each such LMI protocol in turn. Similarly, the router has received one "STATUS" message for each such LMI protocol, and has configured itself for each such LMI protocol in turn. The router and frame relay network equipment have therefore configured themselves for each LMI protocol seriatum; at the flow point 150 they are therefore configured for the same LMI protocol.

Although in a preferred embodiment, the router and frame relay network equipment mutually configure to the last LMI protocol which is mutually recognized, in alternative embodiments it would be possible for the router and frame relay network equipment to mutually configure to another mutually recognized. For example, the frame relay network equipment could respond to the first "STATUS ENQUIRY" message only, and reject all others; the router would then receive only one "STATUS" message in response, and the router and frame relay network equipment would mutually configure to the LMI protocol for that first "STATUS ENQUIRY" message.

The router and frame relay network equipment thereafter communicate using the selected LMI protocol.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method of configuring a router and a frame relay network switch to use a selected LMI protocol in a frame relay network, said method comprising transmitting substantially simultaneously a plurality of requests, one for each of a set of LMI protocols, from said router to said frame relay network switch;

receiving at least one said request at said frame relay network switch, configuring said frame relay network switch in response to said request, and transmitting a response thereto;

receiving said response at said router and configuring said router in response thereto.

2. A method as in claim 1, wherein said step of transmitting comprises the step of setting a timeout for at least one of said plurality of requests.

3. A method as in claim 1, wherein said step of transmitting comprises the step of setting a separate timeout for each one of said plurality of requests.

4. A method as in claim 1, wherein said set of LMI protocols comprise an ANSI protocol, an ITU protocol, and an LMI protocol.

5. A method as in claim 1, wherein said step of receiving and configuring comprises the steps of receiving a first request and configuring said frame relay network switch in response to said first request; and receiving a second request and reconfiguring said frame relay network switch in response to said second request.

6. A method as in claim 5, wherein said step of receiving a second request occurs after said step of receiving a first request, whereby requests received later take priority over requests received earlier.

7. A method as in claim 1, wherein said step of receiving said response comprises the steps of listening on a plurality of LMI management channels for said response; and receiving at least one said response on at least one of said plurality of LMI management channels.

8. A method as in claim 7, wherein said plurality of LMI management channels comprises LMI management channels zero and 1023.

9. A router disposed for coupling to a frame relay network, said router comprising means for transmitting substantially simultaneously a plurality of requests, one for each of a set of LMI protocols, from said router to a switch coupled to said frame relay network;

means for receiving a response to said request from said switch; and means for configuring said router in response to said response.

10. A router as in claim 9, wherein said means for transmitting comprises a timeout for at least one of said plurality of requests.

11. A router as in claim 9, wherein said means for transmitting comprises a separate timeout for each one of said plurality of requests.

12. A router as in claim 9, wherein said set of LMI protocols comprise an ANSI protocol, an ITU protocol, and an LMI protocol.

13. A router as in claim 9, wherein said means for receiving said response comprises means for listening on a plurality of LMI management channels for said response; and means for receiving at least one said response on at least one of said plurality of LMI management channels.

14. A router as in claim 13, wherein said plurality of LMI management channels comprises LMI management channels zero and 1023.

* * * * *

UNITED STATES PATENT AND TRADEMARK OFFICE
CERTIFICATE OF CORRECTION

PATENT NO. : 6,434,120 B1 Page 1 of 1
DATED : August 13, 2002
INVENTOR(S) : Shankar Natarajan and Gregory A. Fowler It is certified that error appears in the above-identified patent and that said Letters Patent is hereby corrected as shown below:

<u>Title page,</u>
Please add:

-- [63] Related U.S. Application Data
This application is a Continuation of application No. 08/672,674, filed on June 28, 1996, now Pat. No. 5,802,042 --

Signed and Sealed this

Twenty-fifth Day of March, 2003

JAMES E. ROGAN
*Director of the United States Patent and Trademark Office*